US008791195B2

(12) United States Patent
Christiansen, III et al.

(10) Patent No.: US 8,791,195 B2
(45) Date of Patent: Jul. 29, 2014

(54) COMPOSITIONS USEFUL FOR NON-CELLULOSE FIBER SIZING, COATING OR BINDING COMPOSITIONS, AND COMPOSITES INCORPORATING SAME

(75) Inventors: Walter Henry Christiansen, III, Richmond, TX (US); Carlton E. Ash, Sugar Land, TX (US); Paul W. Langemeier, Houston, TX (US)

(73) Assignee: Momentive Specialty Chemicals Inc., Columbus, OH (US)

( * ) Notice: Subject to any disclaimer, the term of this patent is extended or adjusted under 35 U.S.C. 154(b) by 412 days.

(21) Appl. No.: 12/713,791

(22) Filed: Feb. 26, 2010

(65) Prior Publication Data
US 2010/0222480 A1    Sep. 2, 2010

Related U.S. Application Data

(60) Provisional application No. 61/156,231, filed on Feb. 27, 2009.

(51) Int. Cl.
C08L 63/00    (2006.01)

(52) U.S. Cl.
USPC ........... 524/494; 524/404; 524/612; 525/523; 525/452; 525/418; 525/55

(58) Field of Classification Search
USPC .......................................................... 524/494
See application file for complete search history.

(56) References Cited

U.S. PATENT DOCUMENTS

| | | | |
|---|---|---|---|
| 3,689,300 A | | 9/1972 | Bunger et al. |
| 4,880,882 A | * | 11/1989 | Morita et al. ................. 525/446 |
| 5,045,363 A | * | 9/1991 | Almer et al. ................. 427/410 |
| 5,464,902 A | | 11/1995 | Recker |
| 5,646,207 A | | 7/1997 | Schell |
| 6,020,063 A | | 2/2000 | Riffle et al. |
| 6,051,314 A | * | 4/2000 | Girgis ........................... 428/375 |
| 6,111,015 A | * | 8/2000 | Eldin et al. ....................... 525/65 |
| 7,176,254 B2 | | 2/2007 | Rische et al. |
| 7,282,260 B2 | * | 10/2007 | LeGrande et al. ............ 428/323 |
| 2002/0051882 A1 | * | 5/2002 | Lawton et al. ................. 428/378 |
| 2002/0191923 A1 | | 12/2002 | Priest et al. |
| 2004/0191511 A1 | * | 9/2004 | Sugiura et al. ................. 428/357 |
| 2005/0127329 A1 | * | 6/2005 | Wang et al. .................... 252/500 |
| 2005/0154084 A1 | * | 7/2005 | Li et al. .......................... 523/201 |
| 2005/0163998 A1 | | 7/2005 | Kashikar et al. |
| 2005/0279140 A1 | | 12/2005 | Adzima et al. |
| 2006/0036003 A1 | | 2/2006 | Adzima et al. |
| 2006/0204763 A1 | | 9/2006 | Hartman et al. |
| 2008/0132606 A1 | | 6/2008 | Dotterer et al. |
| 2008/0248201 A1 | * | 10/2008 | Corkery et al. ............... 427/256 |
| 2009/0092832 A1 | | 4/2009 | Moireau |

FOREIGN PATENT DOCUMENTS

| | | |
|---|---|---|
| WO | WO 2007/014039 | 2/2007 |
| WO | WO 2007/100816 | * 10/2007 |

OTHER PUBLICATIONS

Thostenson, et al., Processing-Structure-Multip-Functional Property Relationship in Carbon Nanotube/Epoxy Compsoties. Carbon, vol. 44, Nol. 14, pp. 3022-3029 (2006).
Xu, et al., Mechanical Property Characterization of a Polymeric Nanocomposite Reinforced by Graphitic Nanofiberw with Reactive Linkers. Journal of Composite Materials, vol. 38, No. 18, pp. 1563-1582 (2004).
McCarvill, et al., Toughening Composites: Nano, Rubber, and Magic, Composites Manufacturing, p. 28-80, (Sep. 2007).
Karger-Kocsis, et al., Microstructure-Related Fracture Toughness and Fatigue Crack Growth Behavior in Toughened, Anhydride-Cured Epoxy Resins, Composites Science and Technology, 48, p. 263-272 (1993).
Maazouz, et al., Toughening of epoxy networks using pre-formed core-shell particles or reactive rubbers, Polymer Bulletin, 33, p. 67-74 (1994).
Daghyani, et al., Fracture behaviour of a rubber-modified tough epoxy system, Journal of Materials Science Letters, 13, p. 1330-1333 (1994).
Park, et al., Thermal Stability and Toughening of Epoxy Resin with Polysulfone Resin, Journal of Polymer Science: Part B: Polymer Physics, 39, p. 121-128 (2001).
Ratna, et al., Toughening of Epoxy Resin Using Acrylate-Based Liquid Rubbers, Journal of Applied Polymer Science, 78, p. 716-723 (2000).
Shin, et al., Toughening of Epoxy Resins with Aromatic Polyesters, Journal of Applied Polymer Science, 78, p. 2464-2473 (2000).
Varley, et al., Toughening of a trifunctional epoxy system Part VI. Structure property relationships of the thermoplastic toughened system, Polymer, 42, p. 3847-3858 (2001).
Wang, et al., Toughening of Epoxy Resin by Functional-Terminated Polyurethanes and/or Semicrystalline Polymer Powders, Journal of Applied Polymer Science, 82, p. 2903-2912 (2001).
Mimura, et al., Toughening of epoxy resin modified with in situ polymerized thermoplastic polymers, Polymer, 42, p. 9223-9233 (2001).
Harani, et al., Toughening of Epoxy Resin Using Synthesized Polyurethane Prepolymer Based on Hydroxyl-Terminated Polyesters, Journal of Applied Polymer Science, 70, p. 2603-2618 (1998).
Harani, et al., Toughening of Epoxy Resin Using Hydroxyl-Terminated Polyesters, Journal of Applied Polymer Science, 71, p. 29-38 (1999).
Andrés, et al., Fracture Toughness of Epoxy Resins Modified with Polyethersulfone: Influence of Stoichiometry on the Morphology of the Mixtures, Journal of Applied Polymer Science, 69, p. 183-191 (1998).

(Continued)

Primary Examiner — Doris Lee

(57) ABSTRACT

Disclosed is a toughened film forming agent for use in a fiber sizing, a finish coating or a binder composition, where the toughened film forming agent includes a film forming polymer and a toughening agent both dispersed in water. The toughening agent may be core shell polymers, rubber, thermoplastic materials, nanomaterials, nanofibers, including any combination or subset thereof. The film forming polymer may be epoxy resins, polyurethane resins, epoxy-polyurethane resins, polyester resins, epoxy-polyester resins, polyvinylacetate resins, polypropylene resins, including any combination or subset thereof.

12 Claims, No Drawings

(56) References Cited

OTHER PUBLICATIONS

Thayer, et al., Carbon Nanotubes by the Metric Ton, Chemical & Engineering News, p. 29-35 (Nov. 12, 2007).

Johnsen, et al., Toughening mechanisms of nanoparticlemModified epoxy polymers, Polymer, 48, p. 530-541 (2007).

Blackman, et al., The fracture and fatigue behaviour of nano-modified epoxy polymers, Journal of Material Science, 42, p. 7049-7051 (2007).

Ye, et al., High Impact Strength Epoxy Nanocomposites with Natural Nanotubes, Polymer, 48, p. 6426-6433 (2007).

* cited by examiner

COMPOSITIONS USEFUL FOR NON-CELLULOSE FIBER SIZING, COATING OR BINDING COMPOSITIONS, AND COMPOSITES INCORPORATING SAME

RELATED APPLICATION DATA

This application claims the benefit of U.S. Provisional Application Ser. No. 61/156,231 filed Feb. 27, 2009, the entire contents of which are hereby incorporated by reference.

FIELD OF THE INVENTION

The invention relates to toughened film forming agents for use in non-cellulose fiber sizing, finish coating or binder compositions. The invention particularly relates to waterborne toughened film forming agents for use in glass fiber sizing compositions and to fiber reinforced composites incorporating same.

BACKGROUND OF THE INVENTION

Non-cellulose fibers are useful in a variety of technologies. For example, glass fibers are used as reinforcements in polymer matrices to form glass fiber reinforced plastics or composites. Glass fibers have been used in the form of continuous or chopped filaments, strands, rovings, woven fabrics, non-woven fabrics, meshes, and scrims to reinforce polymers.

Glass fibers are commonly used as reinforcements in polymer matrices to form glass fiber reinforced plastics or composites because they provide dimensional stability as they do not shrink or stretch in response to changing atmospheric conditions. In addition, glass fibers have high tensile strength, heat resistance, moisture resistance, and high thermal conductivity.

Typically, glass fibers are formed by attenuating streams of a molten glass material from a bushing or orifice. An aqueous sizing composition containing a film forming polymer, a coupling agent, and a lubricant is typically applied to the fibers after they are drawn from the bushing to protect the fibers from breakage during subsequent processing and to improve the compatibility of the fibers with the bulk matrix resins that are to be reinforced. After the sizing composition has been applied, the sized fibers may be gathered into separate strands and wound to produce a glass fiber package. The glass fiber package may then be heated to remove water and deposit the size as a residue lightly coating the surface of the glass fiber.

The toughened film forming agents of the invention may be used with fibers other than glass. Exemplary of such fibers are carbon, graphite, basalt, boron, polyamide and the like. It would be desirable in the art of preparing and using glass fiber compositions to employ glass fibers with improved sizing.

SUMMARY OF THE INVENTION

In one aspect, the invention is a toughened film forming agent for use in a fiber sizing, a finish coating or a binder composition, where the toughened film forming agent includes a combination of a film forming polymer and a toughening agent, where the combination is dispersed in water. The toughening agent may be core shell polymers, rubber, thermoplastic materials, nanomaterials, nanofibers, including any combination or subset thereof. The film forming polymer may be epoxy resins, polyurethane resins, epoxy-polyurethane resins, polyester resins, epoxy-polyester resins, polyvinylacetate resins, polypropylene resins, including any combination or subset thereof.

In another aspect, the invention is a sizing containing a toughened film forming agent which includes a combination of a film forming polymer and a toughening agent, where the combination is dispersed in water. The toughening agent may be core shell polymers, rubber, thermoplastic materials, nanomaterials, nanofibers, including any combination or subset thereof. The film forming polymer may be epoxy resins, polyurethane resins, epoxy-polyurethane resins, polyester resins, epoxy-polyester resins, polyvinylacetate resins, polypropylene resins, including any combination or subset thereof.

In another aspect, the invention is a finish coating containing a toughened film forming agent which includes a combination of a film forming polymer and a toughening agent, where the combination is dispersed in water. The toughening agent may be core shell polymers, rubber, thermoplastic materials, nanomaterials, nanofibers, including any combination or subset thereof. The film forming polymer may be epoxy resins, polyurethane resins, epoxy-polyurethane resins, polyester resins, epoxy-polyester resins, polyvinylacetate resins, polypropylene resins, including any combination or subset thereof.

In another aspect, the invention is a binder composition containing a toughened film forming agent which includes a combination of a film forming polymer and a toughening agent, where the combination is dispersed in water. The toughening agent may be core shell polymers, rubber, thermoplastic materials, nanomaterials, nanofibers, including any combination or subset thereof. The film forming polymer may be epoxy resins, polyurethane resins, epoxy-polyurethane resins, polyester resins, epoxy-polyester resins, polyvinylacetate resins, polypropylene resins, including any combination or subset thereof.

In another aspect, the invention is a fiber reinforced resin composite including a non-cellulose fiber and a bulk resin matrix where the toughened film forming agent, described above, is present in an interface between the non-cellulose fiber and the bulk resin matrix.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. It is to be noted that the phrases "size" and "sizing" refer to the treatment of fibers and are not referential to dimensions. The term "finish coating," as used herein, refers to a coating applied to the surface of substrates, woven from sized non-cellulose fibers, after the sizing agent has been removed. The finish coating thereby improving the compatibility of the cloth with the bulk resin matrix system that the cloth is used to reinforce. The term "binder composition," as used herein, refers to compositions applied to woven or non-woven fibrous substrates in order to impart desired properties such as adhesion and stiffness. For example, in the case of non-woven substrates, the binder is typically used to hold the fibers in a desired orientation as well as to impart stiffness and other performance attributes. Binder compositions are also used to improve the compatibility of such woven and non-woven fibrous substrates with the bulk resin matrix system, when such substrates are used as reinforcements.

One embodiment of the invention is a toughened film forming agent for use in fiber sizing compositions, finish coating compositions or binder compositions for non-cellulose fibers. Exemplary fibers include, but are not limited to glass, carbon, graphite, basalt, boron, and polyamide fibers, including any combination or subset thereof.

The toughened film forming agents of the invention contain at least two different components. The first is a toughening agent selected from materials including, but not limited to, core shell polymers, rubber materials, thermoplastic polymers, nanomaterials, nanofibers, and the like. Exemplary core shell polymers include, but are not limited to Kaneka Kane Ace® MX products which are core shell rubber dispersions in epoxy, cyanate ester, or other resins. In one embodiment, the core shell polymers include a styrene butadiene rubber, a polybutadiene rubber or a siloxane rubber. In another embodiment, the core of the core shell polymer includes a styrene butadiene rubber, a polybutadiene rubber or a siloxane rubber. The core shell polymers, when present, may be dispersed within the film forming polymer in an amount from about 2 to about 70 weight percent (wt %), based upon the weight of the toughened film forming agent; and in some embodiments from about 4 to about 50 wt % or from about 5 to about 40 wt %.

Exemplary rubber materials include, but are not limited to carboxyl-terminated butadiene acrylonitrile rubber (CTBN), amine terminated butadiene acrylonitrile rubber (ATBN), butyl acrylate rubber and silicon rubber. The rubber materials, when present, may be combined, blended, reacted or otherwise dispersed within the film forming polymer in an amount of from about 2 to about 60 wt % based upon the weight of the toughened film forming agent; and in some embodiments from about 4 to about 50 wt % or from about 5 to about 50 wt %.

Exemplary thermoplastic materials include, but are not limited to Arkema Nanostrength® MMA (methyl methacrylate) and SBM (styrene-butadiene-methacrylate) block copolymers, styrene-butadiene block copolymers, polysulfone, polyethersulfone, polyamide, polyurethane, and poly (butylene terephthalate). The thermoplastic materials, when present, may be combined, blended, reacted or otherwise dispersed within the film forming polymer in an amount of from about 1 to about 50 wt % based upon the weight of the toughened film forming agent; and in some embodiments from about 2 to about 40 wt %; or from about 4 to about 20 wt %.

Exemplary nanomaterials include, but are not limited to nanoclays such as halloysite nanotubes (such as those provided by NaturalNano™) and single- and multi-walled carbon nanotubes (such as those provided by Zyvex® Performance Materials and Nanocyl® S.A.). The nanomaterials, when present, may be combined, blended, reacted or otherwise dispersed within the film forming polymer in an amount of from about 0.05 to about 40 wt % based upon the weight of the toughened film forming agent; and in some embodiments from about 0.1 to about 30 wt %; or from about 0.2 to about 20 wt %. In one embodiment, the nanomaterial is characterized as a structure having a size of from 1 to 100 nm in at least one dimension.

Exemplary nanofibers include those such as the graphite nanofibers provided by Catalyx Nanotech™. The nanofibers, when present, may be combined, blended, reacted or otherwise dispersed within the film forming polymer in an amount of from about 0.05 to about 40 wt % based upon the weight of the toughened film forming agent; and in some embodiments from about 0.1 to about 30 wt %; or from about 0.2 to about 20 wt %. In one embodiment, the nanofiber is characterized as a structure having a size of from 1 to 100 nm in at least one dimension.

In one embodiment, the toughened film forming agent of the invention is free of nanoparticles composed of a mineral material selected from clay, boehmite or silica.

The toughening agents may be used in combinations. For example, a CTBN rubber may be used with an ATBN rubber, in some embodiments. Combinations of different types of toughening agents may also be used. For example, a core shell polymer may be used with a rubber material. Subsets of these combinations may also be used with the invention.

The second component that may be present is a film forming polymer. Suitable film formers include a variety of resins based on epoxy, polyurethane, epoxy-polyurethane, polyester, epoxy-polyester, polyvinyl acetate, and polypropylene chemistries and the like. These resins may, in some embodiments, be monomers. In other embodiments, the resins may be oligomers and/or polymers. These resins may be used in combinations. Subsets of these combinations may also be used.

In the practice of the invention, the toughening agent and the film forming polymer may be combined then dispersed in water. In one embodiment, a surfactant is used to assist with dispersing these agents. The surfactant may be cationic, anionic and nonionic. Exemplary surfactants include ethoxylated alkyl phenols, ethoxylated alkyl alcohols, ethoxylated fatty acids ethylene oxide/propylene oxide block polymer, stearic ethanolamide, polyethylene glycol esters, ethoxylated castor oil esters, aliphatic monoamines, aromatic diamines, and aromatic polyamines, amine ethoxylates, cationic fatty amides and the like.

The waterborne toughened film forming agent of the invention is particularly useful in non-cellulose fiber sizing formulations, which may be prepared in any way known to be useful to those of ordinary skill in the art. The formulation may be admixed and heated. In another embodiment, the formulation may be dispersed using a homogenizer. In still another embodiment, the formulation may be prepared using ultrasound to disperse the agents within a continuous water phase.

The toughened film forming agents of the application may be applied to non-cellulose fibers using any method known to be useful to those of ordinary skill in the art. For example, glass fibers may be drawn and applied via roll coating into a sizing compositions, containing the toughened film forming agent, and allowed to dry prior to further handling. In another embodiment, the sizing compositions, containing the toughened film forming agent, may be applied to another sort of fiber, such as graphite fiber, and then the fiber first wound upon a spool and then heated to remove remaining water. In still another embodiment, the fiber may we formed into a fabric, either woven or unwoven and then dried to remove residual water. In yet another embodiment the sizing composition, containing the toughened film forming agent, may be applied to glass fibers via dipping or spraying, In some embodiments, the sizing compositions are applied at a concentration of from about 0.1 to about 3.0 dry wt % as compared to the fiber being sized. In other embodiments, the sizing compositions are applied at a concentration of from about 0.3 to about 1.5 dry wt %. In still other embodiments, the sizing compositions are applied at a concentration of from about 0.5 to about 1.1 dry wt %.

While not wishing to be bound by any theories, it is believed that the most common conventional approach to improve composite toughness is to add one or more of a variety of toughening agents to a bulk resin matrix. While generally effective, this toughening approach is often disadvantaged by high cost, due in part to the high loading of toughening agent required, or the cost of dispersing the toughening agent in the bulk resin system. This toughening agent approach can also be disadvantaged because of a reduction in manufacturing ease due in part to high viscosities of the toughened bulk resin matrix system. This toughening agent approach can further be disadvantaged due in part to a reduction in other composite properties, such as stiffness, glass transition temperature, etc.

It is also believed that a more effective and efficient approach for toughening composite materials may be to place the toughening agents at the interface between the fiber reinforcement and the bulk resin matrix, since typically it is the fiber-matrix interface that is the weak point in a composite system and often the site of composite failure. It may also be desirable to place the toughening agents in the interstitial spaces between the fiber reinforcements. Thus, toughening agents could be mixed with a suitable film former and dispersed in water, the dispersions used as a major component for fiber sizing, reinforcement finishes, or binder compositions, and the resulting fiber product, that is treated with a toughened material, used in the manufacture of reinforced composite articles.

By placing the toughening agent into the film forming layer, much less of the toughening agent may be required. For example, since the toughening agent is being limited to the sizing layer on the fiber being treated and the sizing may be present at no more than about 3 percent by weight of the fiber, it is likely that even in heavily filled composites, there will much less toughening agent required since the toughening agent is limited to a much smaller matrix, the sizing, rather than the resin or other matrix material used as the continuous phase of the composite material, described above as the bulk resin matrix.

Since the toughening agent is admixed with and present in the film forming polymer, it is believed at least some part of the toughening agent will be present at the interface of the sizing and the bulk resin matrix thereby strengthening the referenced weak point.

The bulk resin matrix may include any one of a number of thermoplastic or thermosetting resins. Suitable examples of thermoplastic resins include polyimides, polybenzimidazole, thermoplastic polyesters {poly(ethylene terephthalate), poly (butylene terephthalate)}, polycarbonate, polyolefin, thermoplastic polyurethanes, polyoxymethylene, polyoxyethylene, poly(phenylene ether), polyamides {nylon 6, nylon 6,6, nylon 12, etc.), polyaramides, ionomers, poly(vinyl alcohol), poly (methacrylic acid), poly(lactic acid), cellulose, polysulfone, polyketones, poly(p-vinylphenol), poly(vinyl pyrollidone), polyacrylamide, or poly(vinyl methylether), and the like, including any combination or subset of thereof. Suitable examples of thermosetting resins include epoxy resins, resole resins, novolac resins, oxazine or oxazoline resins, urethane resins, polyester resins, vinyl ester resins, cyanate ester resins and polyimide resins, and the like, including any combination or subset of thereof.

The sizing composition, finish coating or binder composition, containing the toughened film forming agent of the application, may include other components as are commonly used in the art. For example the fiber sizing compositions may include lubricants, coupling agents, binders, emulsifiers, pH modifiers, antifoaming agents, antistatic agents, fungicides, and the like.

In one embodiment, the sizing composition includes the toughened film forming agent of the invention in an amount of from about 50 wt % to about 95 wt %, based upon the total weight of the solids in the sizing composition. In another embodiment, the finish coating includes the toughened film forming agent of the invention in an amount of from about 10 wt % to about 95 wt %, based upon the total weight of the solids in the finish coating. In another embodiment, the binder composition includes the toughened film forming agent of the invention in an amount of from about 40 wt % to about 100 wt %, based upon the total weight of the solids in the binder composition.

The fibers sized with the sizing compositions, containing the toughened film forming agent of the application, may be used in many end-use applications. For example, fibers formed into rovings may be used with pipe, automobile bodies, and rod stock. Woven fabrics may be used in aircraft structures, marine structures, wind turbine blade structures, ordnance hardware, electrical flat sheet, and tubing. Chopped strands may be used in sheet molding compounds and electrical appliance parts. Reinforced mats may be used as translucent sheets, and truck; automobile; and marine body panels. Non-woven fabrics may be used in aircraft structures, for example. These uses are exemplary and are not intended to be limiting upon possible embodiments of the invention.

EXAMPLES

The following examples are provided to illustrate the present invention. The examples are not intended to limit the scope of the present invention and they should not be so interpreted. Amounts are in weight parts or weight percentages unless otherwise indicated.

Example 1

A three liter resin kettle is fitted with an agitator and automatic temperature control. 53.9 grams surfactant (a polyether copolymer of ethylene oxide and bisphenol A with a nominal molecular weight of 17,000) and 124.0 grams water are added to the kettle. The kettle is purged with nitrogen and the contents heated to 140-155° F. while stirring.

860.2 grams of a rubber toughened epoxy resin (a dispersion of 25% SBr (styrene butadiene rubber) core shell rubber particles in 75% liquid epoxy resin based on bisphenol A, with a nominal epoxy equivalent weight of 243 g/eq, a nominal viscosity of 7500 centipoise at 50° C., and a specific gravity of 1.1 commercially available from Kaneka Texas Corporation under the trade name Kane Ace® MX 125) that had been heated to 150° F. are added over 1.2 hours while stirring. The kettle contents are stirred for an additional 1.5 hours while maintaining the internal temperature at about 140° F. 463.4 grams of water are added over one hour while stirring and allowing the mixture to cool to 120° F.

The resulting waterborne resin dispersion has a solids content of 61.4% by weight, a weight per epoxide value of 257 g/eq, a viscosity of 8800 centipoise at 25° C., a volume average particle size of 0.71 microns, and a pH of 4.5.

Example 2

A waterborne resin dispersion is prepared using a method similar to Example 1. 58.6 grams of a low molecular weight bisphenol A epoxy resin (EPON® Resin 834 manufactured by Hexion Specialty Chemicals), 39.0 grams surfactant (a polyamide-modified polyether derived from ethylene oxide with a nominal molecular weight of 13,700) and 119.6 grams water are added to a resin kettle configured as in Example 1. The kettle is purged with nitrogen and the contents heated to 205-210° F. and held for one hour while stirring. 92.0 grams of water are added while cooling the kettle to 140° F., after which 1.0 grams of dodecylbenzenesulfonic acid and 63.4 grams of surfactant (an ethylene oxide-propylene oxide copolymer supplied by BASF under the trade name PLURONIC® F38) are added and stirred into the system.

749.7 grams of a rubber toughened epoxy resin (a dispersion of 25% SBr core shell rubber particles in 75% liquid epoxy resin based on bisphenol A, with a nominal epoxy equivalent weight of 243 g/eq, a nominal viscosity of 7500 centipoise at 50° C., and a specific gravity of 1.1 supplied by Kaneka Texas Corporation under the trade name Kane Ace® MX 125) that had been heated to about 140° F. are added while stirring. The kettle contents are stirred for 7.5 hours while maintaining the internal temperature at 125-140° F. 477.6 grams of water are added over one hour while stirring and allowing the mixture to cool to 90° F.

The resulting waterborne resin dispersion has a solids content of 56.7% by weight, a weight per epoxide value of 272 g/eq, a viscosity of 2600 centipoise at 25° C., a volume average particle size of 0.42 microns, and a pH of 7.1.

Example 3

Samples of Style 7781 woven E-glass cloth (with a balanced weave in the warp and fill directions and a nominal areal weight of 27.9 g/ft²) were prepared by JPS Composite Materials (Anderson, S.C.). The glass cloth samples had finish treatments applied by hand by JPS Composite Materials using one of three finish combinations: (A) JPS 09437 commercial finish consisting of a proprietary silane (the comparative sample), (B) the product of Example 1 diluted with water to achieve the desired coating viscosity, and (C) a blend of the product of Example 1 and the proprietary JPS 09437 finish diluted with water to achieve the desired coating viscosity. Areal weights for the resulting cloth samples are listed in Table 1.

TABLE 1

Style 7781 Glass Cloth Samples

| Glass Cloth Sample | Finish Description | Areal Weight (g/ft²) |
|---|---|---|
| 3A - Comp | JPS 09437 finish (proprietary silane) | 27.6 |
| 3B | The product of Example 1 | 27.7 |
| 3C | A blend of the product of Example 1 and JPS 09437 finish | 27.9 |

Example 4

45.5 grams of a phenol novolac with a nominal hydroxyl equivalent weight of 106 g/eq (EPONOL™ 6000IZ04 manufactured by Hexion Specialty Chemicals) were combined with 52 grams of methylethyl ketone and mixed at 70-75° F. until the solid material had dissolved. To this mixture were added 84.5 grams of a low molecular weight bisphenol A epoxy resin with a nominal epoxy equivalent weight of 187 g/eq (EPON® Resin 828LS manufactured by Hexion Specialty Chemicals) and 1.3 grams of a 10% by weight solution of 2-methylimidazole in propylene glycol monomethyl ether. The resulting varnish formulation had a nominal gel time of 125-130 seconds when measured at 171° C. Approximately 40-45 cc of the varnish was coated using a paint brush onto 13-inch×14-inch pieces of the glass cloth samples described in Example 3 and hung vertically in a convection oven at 163° C. for 4-5 minutes to evaporate the solvents and partially cure the mixture to obtain prepregs with nominal areal weights of 45-48 g/ft², resin contents of 37-42% by weight, and prepreg dust gel times of 19-36 seconds at 171° C.

Example 5

Laminate samples of nominal 0.125 inch thickness were prepared from the prepregs described in Example 4 using a layup of 14 prepreg plies, each ply 6-inches by 6-inches, pressing the prepregs between aluminum plates lined with Tedlar™ release film and using a heating rate of 10° F./min from 75° F. to 350° F., a hold time of 60 minutes at 350° F., and cooling to 100° F. at 15° F./min with an applied pressure of 100 psig during the press cycle. From the resulting laminates were cut 3-inch by 1-inch pieces which were tested for flexural properties in accordance with ASTM D-790 using a span of 2 inches and a crosshead speed of 0.05 in/min. The resulting laminate, prepared with the toughened film forming agent of the invention, demonstrates improved flexural elongation and toughness values over the comparative, as set forth in Table 2.

TABLE 2

Laminate Samples and Flexural Test Results

| | Glass Cloth Reinforcement | | |
|---|---|---|---|
| | 3A- Comp | 3B | 3C |
| Laminate Thickness (inches) | 0.127 | 0.123 | 0.123 |
| Estimated Laminate Resin Content (wt. %) | 31.9 | 30.5 | 30.5 |
| Flexural Strength at Break (ksi) | 78.6 | 79.5 | 78.1 |
| Standard Deviation | 2.1 | 0.7 | 1.0 |
| Flexural Elongation at Break (inches) | 0.108 | 0.131 | 0.131 |
| Standard Deviation | 0.003 | 0.006 | 0.004 |
| Flexural Toughness (psi) | 101.8 | 122.7 | 119.9 |
| Standard Deviation | 1.0 | 2.8 | 2.5 |

Testing Conditions

Solids: The percent solids were measured by placing 0.5 grams sample in a small aluminum pan, adding 2 ml Methyl Cellosolve®, placing the sample on a hot plate at 200° C. for 25 minutes, and calculating the solids from the weight lost.

WPE: The weight per epoxide (WPE or EEW) was determined by potentiometric titration using known methods, tetraethylammonium bromide and correcting for percent solids (as described above) to determine the WPE value at 100% solids content.

Viscosity: Viscosities were measured at 25° C. using a Brookfield® RVTDV-II Viscometer fitted with spindle #5 and a speed setting of 10 rpm.

Particle Size: Dispersion particle size values were measured with a Coulter LS230 particle size analyzer. Dv is the volume average particle size in microns.

pH: pH values were measured with an Accumet® AB15 pH meter from Fisher Scientific.

Gel time: Gel times were measured by placing approximately two drops of resin varnish or about 0.1 gram of prepreg dust on a hot plate set to 171° C. and measuring the time until the sample transitioned from a liquid to a gelled state (at which time reversible deformation was not possible without rupturing the sample).

The invention claimed is:
1. A toughened film forming agent for use in a fiber sizing or a finish fiber coating, the toughened film forming agent consisting essentially of:

a combination of a film forming polymer, and a toughening agent, where the combination is dispersed in water with a surfactant, wherein the toughening agent is selected from the group consisting of core shell polymers, rubber materials, thermoplastic materials, and combinations thereof, and the thermoplastic material is selected from the group consisting of methyl methacrylate and styrene-butadiene-methacrylate block copolymers, styrene-butadiene block copolymers, polysulfone, polyethersulfone, poly(butylene terephthalate) and combinations thereof, and wherein the film forming polymer is selected from the group consisting of epoxy resins, epoxy-polyurethane resins, epoxy-polyester resins, and combinations thereof, wherein, if present, the core shell polymers comprises from about 2 wt % to about 70 wt % based upon the weight of the toughened film forming agent;

wherein, if present, the rubber material comprises from about 2 wt % to about 60 wt %, based upon the weight of the toughened film forming agent; and wherein, if present, the thermoplastic material comprises from about 1 wt % to about 50 wt %, based upon the weight of the toughened film forming agent.

2. The toughened film forming agent of claim 1 wherein the rubber material is selected from the group consisting of carboxyl-terminated butadiene acrylonitrile rubber, amine terminated butadiene acrylonitrile rubber, butyl acrylate rubber, silicon rubber and combinations thereof.

3. A sizing comprising the toughened film forming agent of claim 1.

4. A finish fiber coating comprising the toughened film forming agent of claim 1.

5. A fiber reinforced resin composite comprising a non-cellulose fiber, a bulk resin matrix and an interface between the non-cellulose fiber and the bulk resin matrix, wherein the interface comprises the toughened film forming agent of claim 1.

6. The fiber reinforced resin composite of claim 5, wherein the non-cellulose fiber comprises glass, carbon, graphite, basalt, boron or polyamide fiber.

7. The fiber reinforced resin composite of claim 5, wherein the non-cellulose fiber comprises glass.

8. A toughened film forming agent for use in a fiber sizing or a finish fiber coating, the toughened film forming agent consisting essentially of:

a combination of a film forming polymer, and a toughening agent, where the combination is dispersed in water with a surfactant, wherein the toughening agent comprises core shell polymers, wherein the film forming polymer is selected from the group consisting of epoxy resins, polyurethane resins, epoxy-polyurethane resins, polyester resins, epoxy-polyester resins, polyvinylacetate resins, polypropylene resins, and combinations thereof, and wherein the toughening agent is a core shell polymer is present in an amount of about 2 to about 70 wt % based upon the weight of the toughened film forming agent.

9. The toughened film forming agent of claim 8 wherein the core shell polymer comprises a styrene butadiene rubber, a polybutadiene rubber or a siloxane rubber.

10. The toughened film forming agent of claim 8 wherein the film forming polymer comprises an epoxy resin.

11. A toughened film forming agent for use in a fiber sizing or a finish fiber coating, the toughened film forming agent comprising:

a combination of a film forming polymer, and a toughening agent, where the combination is dispersed in water with a surfactant, wherein the toughening agent is a core shell polymer present in an amount of about 2 to about 70 wt % based upon the weight of the toughened film forming agent, wherein the core shell polymer comprises a styrene butadiene rubber, a polybutadiene rubber or a siloxane rubber, and wherein the film forming polymer is selected from the group consisting of epoxy resins, polyurethane resins, epoxy-polyurethane resins, polyester resins, epoxy-polyester resins, polyvinylacetate resins, polypropylene resins, and combinations thereof.

12. The toughened film forming agent of claim 11, wherein the film forming polymer comprises an epoxy resin.

* * * * *